United States Patent [19]

Benda et al.

[11] Patent Number: 5,157,684
[45] Date of Patent: Oct. 20, 1992

[54] OPTICALLY PULSED LASER

[75] Inventors: John A. Benda, Amston; Paul R. Blaszuk, Lebanon; Gary E. Palma, Bloomfield; David C. Smith, Glastonbury, all of Conn.

[73] Assignee: United Technologies Corporation, Hartford, Conn.

[21] Appl. No.: 781,430

[22] Filed: Oct. 23, 1991

[51] Int. Cl.⁵ .............................................. H01S 3/08
[52] U.S. Cl. ...................................... 372/95; 372/97; 372/98; 372/99
[58] Field of Search ..................... 372/10, 12, 21, 26, 372/55, 69, 72, 92, 93, 96, 94, 97, 98, 99, 18, 19

[56] References Cited

U.S. PATENT DOCUMENTS

| | | | |
|---|---|---|---|
| 3,921,096 | 11/1975 | Chenausky et al. | 372/95 |
| 4,025,172 | 5/1977 | Freiberg | 372/95 |
| 4,079,340 | 3/1978 | Weiner et al. | 372/95 |
| 4,164,366 | 8/1979 | Sziklas et al. | 372/95 |
| 4,429,400 | 1/1984 | Kaye | 372/98 |
| 4,491,950 | 1/1985 | Hoffmann | 372/95 |
| 4,514,850 | 4/1985 | Holmes et al. | 372/95 |
| 4,682,339 | 7/1987 | Sziklas et al. | 372/95 |
| 4,841,541 | 6/1989 | Sziklas et al. | 372/94 |
| 4,991,182 | 2/1991 | Logan et al. | 372/95 |
| 5,012,483 | 4/1991 | Reintjes et al. | 372/95 |

Primary Examiner—Brian Healy

[57] ABSTRACT

An unstable resonator, dc excited, is pulsed using an adjoint coupled beam of low power as the pulsing element. The resonator feedback consists of the self-feedback and the adjoint beam feedback. The self-feedback can be sufficient for self-oscillation and pulsed operation can be achieved by controlling the repetition rate and the magnitude of the adjoint beam power. Complete control and shut-off between pulses with complete freedom of repetition rate is achieved if the self-feedback is insufficient for laser oscillation. The invention was demonstrated on a 10 kilowatt average power $CO_2$ laser with pulse control provided by with a 100 watt adjoint feedback beam.

16 Claims, 7 Drawing Sheets

OPTICALLY PULSED LASER

CROSS REFERENCE TO RELATED APPLICATIONS

This application is related to the subject matter disclosed and claimed in copending U.S. Ser. No. 781,771, pending, entitled A HIGH POWERED LASER WITH REDUCED OPTICAL ABERRATION by P. R. Blaszuk;

U.S. Ser. No. 780,897, pending, entitled A HIGH POWER LASER HAVING STAGED LASER ADJOINT PULSED FEEDBACK by S. S. Townsend, P. R. Cunningham and J. S. Foley;

U.S. Ser. No. 780,637, pending, entitled OPTICALLY PULSED LASER HAVING COUPLED ADJOINT BEAMS by J. A. Benda;

U.S. Ser. No. 780,898, pending, entitled A MODE-LOCKED HIGH POWER LASER HAVING AN ADJOINT FEEDBACK BEAM by J. A. Benda, P. R. Blaszuk and G. E. Palma;

U.S Ser. No. 781,431, pending, entitled PULSED RING LASERS USING ADJOINT COUPLING CONTROL by G. E. Palma and J. A. Benda;

U.S. Ser. No. 781,426, pending, entitled LINEAR POLARIZATION CONTROL OF HIGH POWER LASERS by J. A. Benda, P. R. Blaszuk, J. Forgham and H. L. Cohen;

U.S. Ser. No. 781,427, pending, entitled IMPROVED LINEAR POLARIZATION CONTROL OF HIGH POWER LASERS by G. E. Palma, S. S. Townsend, A. Parasco and J. A. Benda;

U.S. Ser. No. 781,428, pending, entitled CIRCULAR AND ELLIPTICAL POLARIZATION OF A HIGH POWER LASER BY ADJOINT FEEDBACK by J. A. Benda and P. R. Blaszuk filed on even date herewith and assigned to the same assignee herein incorporated by reference.

TECHNICAL FIELD

The field of the invention is that of high power industrial lasers.

BACKGROUND ART

In industrial lasers used for welding or drilling, it is convenient to be able to pulse the optical beam. TEA lasers have been used to provide pulsed beams, as has Q-switching of cw (continuous wave) excited lasers. Also, optical chopping of a cw beam such as in a MOPA configuration or optically chopping the resonator internally have also been used. Each technique has advantages and limitations. Pulsed electrical power supplies are expensive, require voltages sufficient to break down the laser gas and require electrical power conditioning. Optically chopped MOPAs require isolation between the amplifier and the oscillator and are sensitive to self oscillation from feedback from work pieces. Chopping of the high power beam requires a chopper to withstand the effect of the high power beam. U.S. Pat. No. 4,512,021 illustrates passive Q-switching of a waveguide laser having a stable resonator and a coupled control cavity. U.S. Pat. No. 4,550,410 illustrates a coupled-cavity laser in which the coupled cavity serves to pass the output beam. This reference uses transmissive optics that pass more than 15% of the cavity power and therefore is not suitable for industrial power lasers.

DISCLOSURE OF INVENTION

The invention relates to a pulsed continuously-pumped, high-power laser in a standing wave unstable resonator configuration.

A feature of the invention is that the amount of power in the feedback leg which is used to pulse the laser is on the order of a few percent of the total power in the parent resonator.

A further feature of the invention is the modification within limits of the pulse repetition rate and pulse width.

Other features and advantages will be apparent from the specification and claims and from the accompanying drawings which illustrate an embodiment of the invention.

BEST MODE OF CARRYING OUT THE INVENTION

Figure 2:
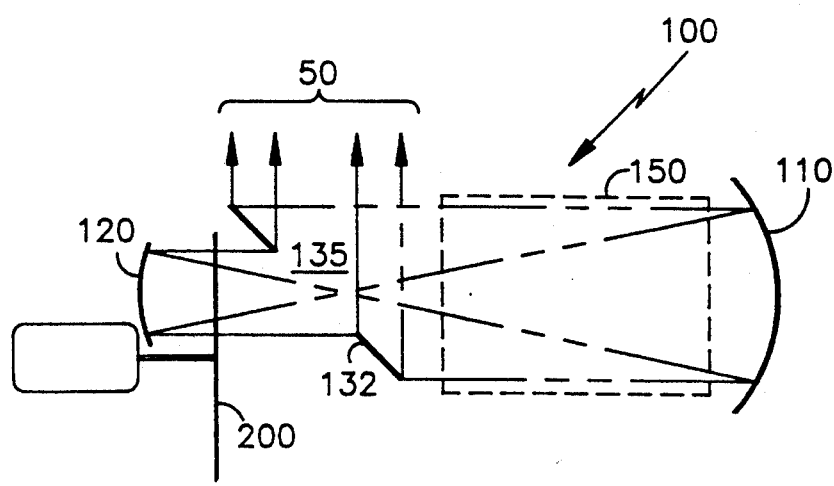
FIG. 2 illustrates a prior art pulsed laser.

Referring now to FIG. 2, there is shown a schematic of a prior art pulsed gas discharge laser, in which a laser resonator 100 has a gain medium 150 disposed between primary mirror 110 and feedback mirror 120. The collimated output beam 50 is extracted from the resonator by scraper mirror 132 having central aperture 135. A mechanical chopper denoted schematically by the numeral 200 physically blocks the feedback mirror and thus controls the feedback (or cavity loss) of the total resonator 100 to pulse the laser on and off. In order for such a chopper to control a laser having output power in the kilowatt range, the chopper must be very rugged and may be impossible to fabricate because of the high flux loading.

Figure 1:
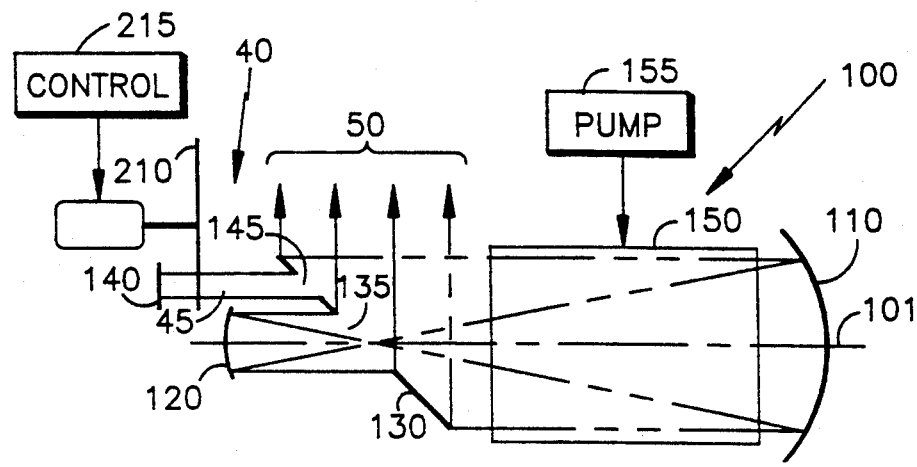
FIG. 1 illustrates schematically an embodiment of the invention.

Referring now to FIG. 1, there is illustrated in schematic form an embodiment of the invention. Primary mirror 110, feedback mirror 120 and gain medium 150 are disposed as before in parent resonator 100, defined by mirrors 110, 120 and 130. Pump means 155 is a DC power supply, meaning a power supply that can be controlled in voltage or current only slowly, as compared with pulsed power supplies and rf power supplies. It will be referred to as substantially DC pump means. The mechanism for producing a population inversion is that of a glow discharge as illustrated in U.S. Pat. No. 3,641,457. The output mirror 130 has been modified by addition of a second, much smaller feedback aperture 145 that passes an output feedback beam 45 to adjoint feedback mirror 140. A smaller, lighter mechanical chopper or shutter 210 is used to modulate the feedback beam. Chopper 210 is controlled by control means 215, which may be a programmed general purpose digital computer or a simple timing circuit or timer, to control chopper 210 at a predetermined rate to give a predetermined rise time and predetermined repetition rate to the output pulse of the system. Control means 215 may also control the position of mirror 140, so that the return feedback radiation has a predetermined phase, in a conventional active control system. The total system comprises a composite resonator having parent resonator 100 and a leg, or section, of the composite resonator that will be referred to collectively as the feedback leg 40 and includes the aperture and mirror as the feedback means. This additional feedback leg provides additional feedback that reduces the loss of the composite optical resonator.

As will be explained below, feedback beam 45 is reflected back into resonator 100 in a particular configuration of direction and phase distribution such that it is mode matched to the adjoint mode of the resonator. A definition of adjoint mode is given in "Orthogonality Properties of Optical Resonator Eigenmodes", by A. E. Siegman, Optics Comm., Vol. 31, pp. 369-373, December, 1979. This causes the reflected radiation to converge down into the optic axis of the resonator, making several passes before it spreads diffractively and contributes to the resonator output. The effect of this is to reduce the resonator loss (by increasing the system feedback) more than by other means of injecting the feedback beam, thus allowing a low power beam to have a large effect.

In the example shown, the output radiation is collimated, so the output beam is simply reflected with a flat mirror. In general, for non-collimated output, a curved mirror will be necessary to mode match to the adjoint mode of the resonator.

As an example, consider the resonator of FIG. 1. The compound resonator eigenvalue $\gamma_c$ is given approximately by $$\gamma_c \approx \frac{1}{M} + \frac{A_c}{\lambda f_1} \qquad (1)$$

where M is the magnification of the parent resonator; $A_c$ is the area of the adjoint feedback aperture 145 in leg 40; $\gamma$ is the laser wavelength and $f_1$ is the focal length of the primary mirror 110. The first term in equation (1) is the contribution of the parent resonator self-feedback to the eigenvalue and the second term is the contribution of the feedback of the adjoint beam 40. The power feedback is proportional to $$\gamma_c^2 \approx \frac{1}{M^2} + \frac{2A_c}{\lambda M f_1} + \left(\frac{A_c}{\lambda f_1}\right)^2 \qquad (2)$$

Therefore, the equivalent compound or composite resonator has a total feedback value that is greater than that of the parent resonator ($1/M^2$) by the second and third terms. The third term in equation (2) is often negligible. In a numerical example, a DC-excited laser having a nominal optical power of 14 KW cw was pulsed in the following configuration. $M=3.4$; $A_c=0.196$ cm$^2$; $\gamma=10.6\mu$; $f_1=11.2$ m. The total area of the output beam was 18 cm$^2$. In this case the eigenvalue of the parent resonator equals 0.294 and the eigenvalue of the compound resonator (when the shutter is open and there is a compound resonator including both parent resonator 100 and resonator control leg 40) equals $0.294+0.165=0.459$. The power fed back increases by the ratio $(0.459/0.294)^2=2.4$ despite the fact that only about 1% of the output beam is used. This is equivalent to a resonator with a magnification of 2.2, significantly different from the parent resonator. This shows the extremely high impact that a small adjoint beam can have on the feedback of the resonator. Since the cavity loss is proportional to $(1-\gamma^2)$, the change in $\gamma$ above means that the cavity loss has substantially decreased and therefore, for these operating conditions, that the circulating power has substantially increased. We speak in terms of increasing the feedback from a parent resonator value to a composite resonator feedback value. An equivalent description of the operation of the system could be expressed in terms of increasing the system eigenvalue from a parent resonator value to a composite resonator value or in terms of decreasing the resonator loss from a parent resonator value to a composite resonator value.

The "leverage" effect from the use of adjoint feedback rather than non-adjoint feedback results from the fact that in any unstable resonator the adjoint mode is converging down to the resonator axis 101, so that the radiation fed back in from adjoint beam 45 makes several passes as it "walks" or converges down to axis 101 as it is reflected between mirrors 110 and 120, before it spreads diffractively and contributes to the resonator loss. The adjoint feedback power thus makes many more passes through the gain medium than non-adjoint feedback power would.

Those skilled in the art will realize that a relatively high power feedback leg 40 could be used to pulse the laser on condition that: a) the cavity loss of the parent resonator is such that the small signal gain is below threshold when used with the parent resonator and the laser does not oscillate; and b) that the magnitude of the feedback provided by beam 45 is large enough that the addition of the feedback beam puts the composite (resonator 100 plus control leg 40) laser above threshold. The condition can be paraphrased as requiring that the capacity of pump means 155 to maintain the population inversion in spite of the compound cavity loss must be above some threshold referred to as the "cw capacity" and the capacity of the pump must be such that it cannot maintain the inversion above threshold when the losses are those of parent resonator 100. The term capacity, as used here, means the capacity that the pump is set up to produce in this system, not its absolute maximum capacity. The feedback beam would also have to be sufficient to raise the laser from below threshold to above threshold with a margin or tolerance for variations in the operating parameters of the system. In a production model laser, the pumping means would run at maximum and the resonator loss would be designed to meet these criteria. The amount of feedback power required to switch a resonator of the type in FIG. 1 using a non-adjoint feedback beam would be on the order of 10% of the circulating power. As is described below, such a large amount of feedback would not only require a heavy chopper, but would also seriously degrade the beam quality.

It has been found that it is also possible to pulse the laser even if the cavity loss of the parent resonator is such that the small signal gain is above threshold, provided the repetition rate of the pulsing is sufficiently fast that the saturated gain resulting from lasing with the shutter open (so that the adjoint mode feedback beam returns to parent resonator 100) does not have sufficient time to recover while the shutter is closed. The saturated gain resulting from lasing with an open shutter will be below threshold without the additional feedback from the adjoint feedback beam and will remain so while the shutter is closed. A smaller feedback leg 40 will accomplish pulsing in this case compared to the case discussed above where the parent resonator will not lase, even continuous wave.

Figure 3:
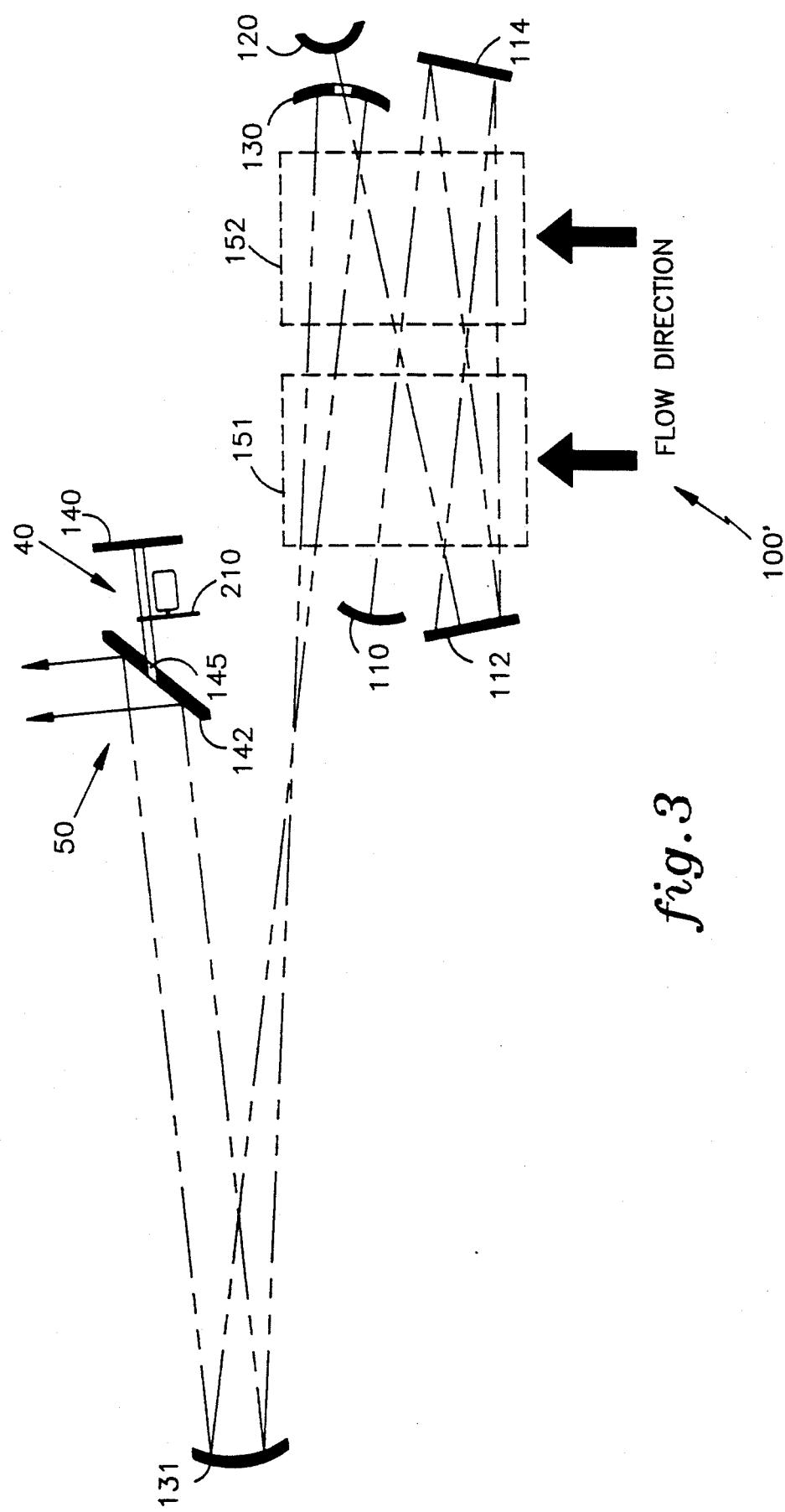
FIG. 3 illustrates another embodiment of the invention.

Referring now to FIG. 3, there is shown schematically an embodiment of the invention in which a 14 kilowatt cw laser available from United Technologies Industrial Laser Division of United Technologies Corporation of East Hartford, Conn. was used with two transverse flow gain cells 151 and 152 in a multipass configuration. The resonator was bounded by primary convex mirror 110 and concave mirror 120 with flat mirrors 112 and 114 used to provide multiple passes through the gain medium. Output mirror 130, having a 2.4 meter focal length, passed the output beam through an aerodynamic window, not shown, to another mirror 130, also having a 2.4 meter focal length, that provided a final collimated output beam 50. A turning mirror 142 having an aperture 145 provided feedback beam 45 in feedback leg 40 (so that mirrors 130 and 142 provide the functions of mirror 130 in FIG. 1). Feedback mirror 140 reflected the feedback beam back into the resonator, modulated by chopper 210. The nominal parameters of the resonator were $L=9.58$ m, $a=0.635$ cm, $R_1=-6.4$ m, $R_2=22.3$ m and $N_{eq}=0.318$, where L is the cavity length, a is the radius of aperture 135 in mirror 130, $R_2$ is the radius of curvature of the convex mirror 120, $R_2$ is the radius of curvature of concave mirror 110, and $N_{eq}$ is the equivalent Fresnel number. The nominal diameter of aperture 145 is 5 mm. It is positioned nearly tangent to aperture 135 in the output beam, essentially in the maximum intensity region of the output beam. The adjoint beam in leg 40 contains 1.5 percent of the total output power and has 150 watts of power for an output beam power of 11 kilowatts.

Figure 4A:
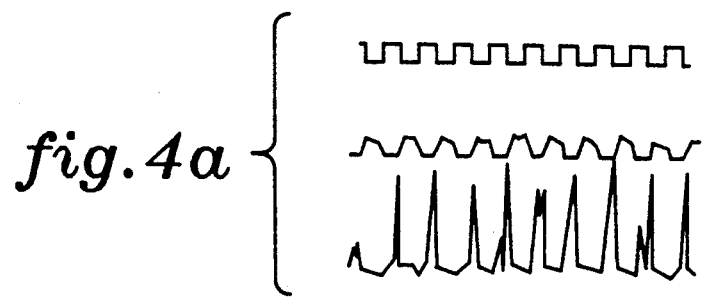
FIGS. 4(a)–(c) illustrates data taken with the embodiment of 3.
Figure 4B:
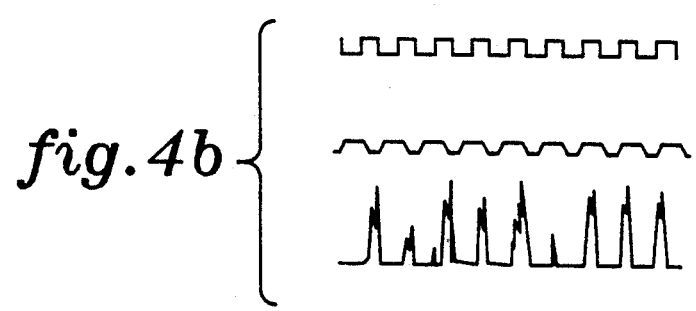
Figure 4C:
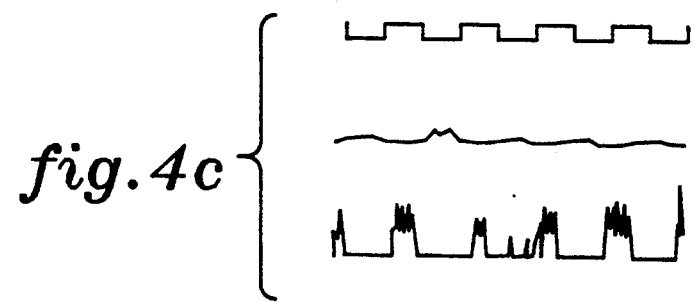

Referring now to FIG. 4, there is shown a series of oscilloscope traces of the chopper timing signal, the low power beam 45 in leg 40, and the high power output beam 50. The three FIGS. 4a, 4b, and 4c are at levels of 2.7 kilowatts, 6.7 kilowatts and 10.2 kilowatts, respectively. The time scale is 1 millisecond per division for FIGS. 4a and b and 500 microseconds per division for FIG. 4c. The top trace in each figure is the chopper reference signal showing the 1 Khz chopping frequency and the equal on and off times of the chopper. The second trace is the adjoint beam in leg 40 showing the finite rise and fall times caused by the fact that the mechanical chopper sweeps across the aperture in a finite time. The rise and fall times are approximately 100 microseconds and the on and off times are approximately 400 microseconds each. The bottom trace is the output of laser beam 50.

Figure 7A:
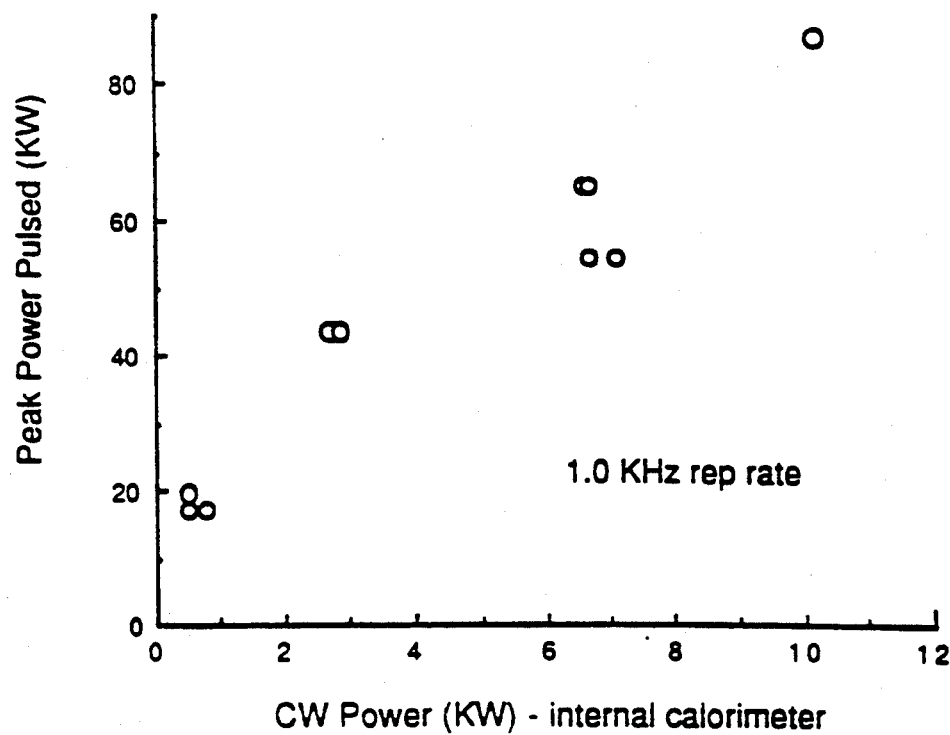
FIGS. 7(a)–(b) illustrates data taken with the embodiment of FIG. 3.
Figure 7B:
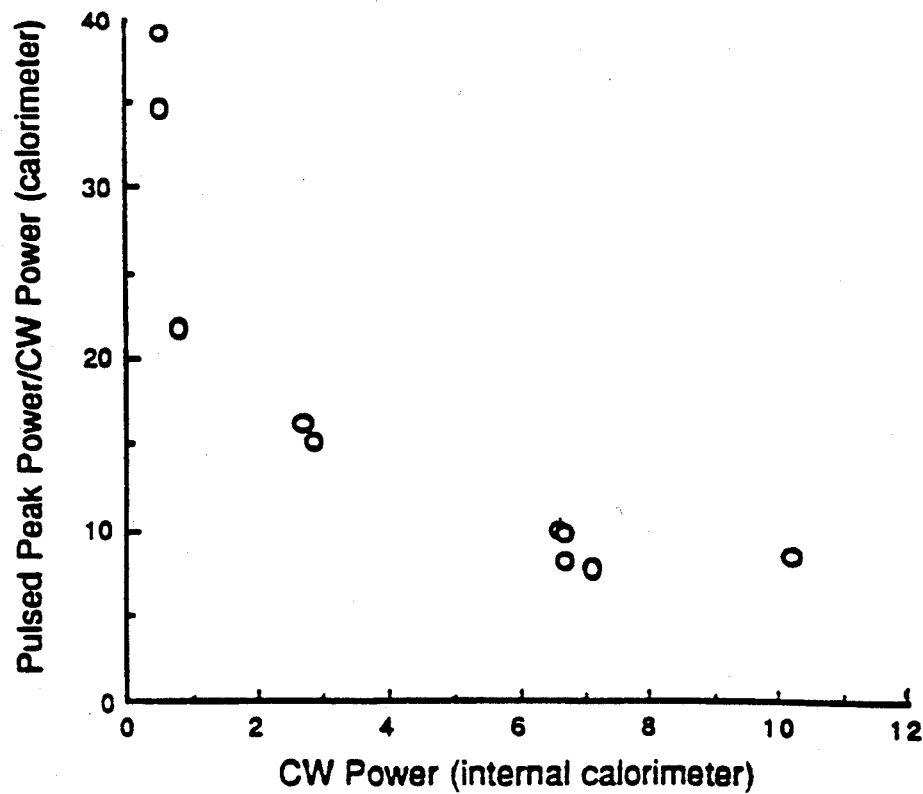

The main or parent resonator 100 is pumped at a rate such that it will run in a continuous wave mode if the chopper is kept closed for a time that is explained below; i.e., resonator 100 is above threshold. It is noteworthy that the same average power was obtained whether the laser was pulsed or not; i.e., the adjoint pulsing caused no measurable loss in overall laser efficiency. FIGS. 7a and 7b show comparisons of the peak and cw power for the apparatus illustrated in FIG. 3. The x-axis in both figures is the cw power, which was varied by controlling the DC power supply to deliver more current through the gain medium. In FIG. 7a the peak power in the initial spike is plotted, and in FIG. 7b, the ratio of the peak power to the cw power is plotted.

While the shutter is open, the gain in the laser will be reduced via saturation by the circulating power. By the end of the pulse the saturated gain will approach the cw limit in which the round trip gain just equals the cavity losses. When the shutter is closed, the cavity losses increase, the saturated gain is now below threshold, and laser output stops. The inversion in the gain medium is being repopulated by the pumping source, however, and the gain starts to increase towards its small signal level. When the shutter is opened, the cavity losses fall dramatically, the gain is now above threshold, and a pulse develops. The feedback beam feeds a very small amount of additional feedback power into the resonator. The additional power, on the order of 1% of the output power, would not be enough to initiate lasing in a conventional resonator configuration. Since the feedback power is in the adjoint mode, however, it "walks" through the volume of the resonator as the radiation converges radially down to axis 101. Near the axis, diffractive spreading causes the adjoint beam to contribute to the resonator output. Thus the effect of the power fed back from leg 40 is essentially multiplied by the effect of making several passes through the gain medium before significant loss occurs.

With this increased effective feedback power, there is established a composite resonator feedback value of the composite feedback of the composite resonator, greater than the parent resonator feedback value of resonator 100 by itself, that is sufficient to cause the composite resonator gain of the system to be above a composite threshold value, so that the circulating power in resonator 100 builds up rapidly to produce a sharp spike in the output characteristic of Q-switched lasers that falls off gradually as two effects operate. One effect is that the upper lasing state is depleted and the other effect is that the temperature of the gas in the resonator is increased. Both these effects combine to reduce the amount of power available by reducing the population in the upper lasing level, which is reflected in the fall off in the output power. Eventually, the power falls below threshold and the laser turns off. The laser recovers as the effect of the pump increases the population inversion and cooler gas flowing in, as indicated by the arrows in FIG. 3, pushes the hot gas out of the resonator.

The time that is most important in repopulating the laser and allowing it to pulse again is the slower of these two processes. For the laser described above, the gain medium will have recovered in 2 milliseconds, so that there is a lower limit on the repetition rate. If the repetition rate is less than 500 Hz, the laser will oscillate before the shutter is opened, because the population of the upper level in the gain medium has time to recover. (This assumes the laser with just the parent resonator will lase cw. The upper limit on the repetition rate is determined by the time required for the shutter on the adjoint feedback beam to cycle through one period, from closed to open and back to closed again, or the time for a pulse to build up in the resonator (which is normally on the order of ten round trip transit times), whichever is longer. For the embodiment of FIG. 3, the latter time is about 0.7 $\mu$sec, while the former is about 50 $\mu$sec for a mechanical chopper, giving an upper limit of about 20 KHz.

Both of these limits can be adjusted within a limited range. The lower limit can be extended by opening the shutter slowly, by using less pumping and/or by increasing the magnification of the resonator with the shutter closed relative to the effective magnification with the shutter open. The upper limit can be extended by using an electro-optic modulator for the shutter to hold the shutter open for a time on the order of 1 $\mu$sec and designing the resonator so that the upper level is depleted rapidly. For a given resonator design, there is a minimum time that the shutter must be kept open in order to deplete the upper state sufficiently to turn the laser off. For welding or hole-cutting applications, it does not matter if the laser is running with a long tail or even a cw background intensity with a Q-switch spike superimposed on it, so long as the intensity in the low level is too low to affect the workpiece.

Since the power in beam leg 40 is so low, an electro-optic modulator having a nominal switching time of 1 $\mu$sec can also be used. Suitable modulators are germanium acousto-optic modulators, commercially available at 10.6 $\mu$m from either Isomet Corp of Springfield, Va. or Intra Action Corp of Bellwood, Ill. Also, CdTe and GaAs electro-optic switches for use at 10.6 $\mu$m are available from Two-Six Inc, Saxonburg, Pa. In this case, the rise and fall times of 100 microseconds will be reduced to 1 $\mu$sec and the limit will not be the mechanical traverse of the chopper across feedback aperture 145, but the build-up time to restore the population inversion above threshold. The rate at which power in the adjoint return feedback beam increases will be called the coupling rate. The output will be a Q-switched pulse having a spike with a width of 100 to 200 nanoseconds that will have a peak intensity of about 100 times the cw power. This sharper pulse will be followed by a low intensity tail with a width of about 10 microseconds. In this mode also the laser will shut off due to thermal relaxation and translational heating of the gas. It is possible to shut off the laser by closing the shutter when the upper level is partially depleted below a value that will depend on the detailed resonator design. The pump capacity must always be sufficient to cause the gain to be above threshold for the composite resonator for CW operation.

Control of the feedback can produce an output beam having varied time dependence. The output power can have an initial ramp or rise time that can extend from a few nanoseconds to a time on the order of seconds. The width of the high power section may vary from about 100 nanoseconds to essentially cw. For example, if it is desired to have an initial peak in the intensity to ignite a plasma above a metal surface (as shown in U.S. Pat. No. 4,395,616 issued to D. C. Smith and R. G. Meyerand) and then to have a long pulse, resonator 100 will be set up to produce a cw beam when the shutter or chopper is partially open to a predetermined "steady" value that will produce the required power, so that the parent resonator and the control leg are coupled with two values of feedback power. This may be done with either a partially open mechanical shutter or a partially transmissive electrooptic modulator. When the shutter is fully open, a Q-switched spike occurs and when the shutter is fully closed, resonator 100 is below threshold. The DC power supply may also be varied, under control of controller 215, in a time on the order of seconds to raise the gain in resonator 100 from an initial value suitable for suppressing cw operation to a higher value to provide the desired "flat top" output.

Figure 6:
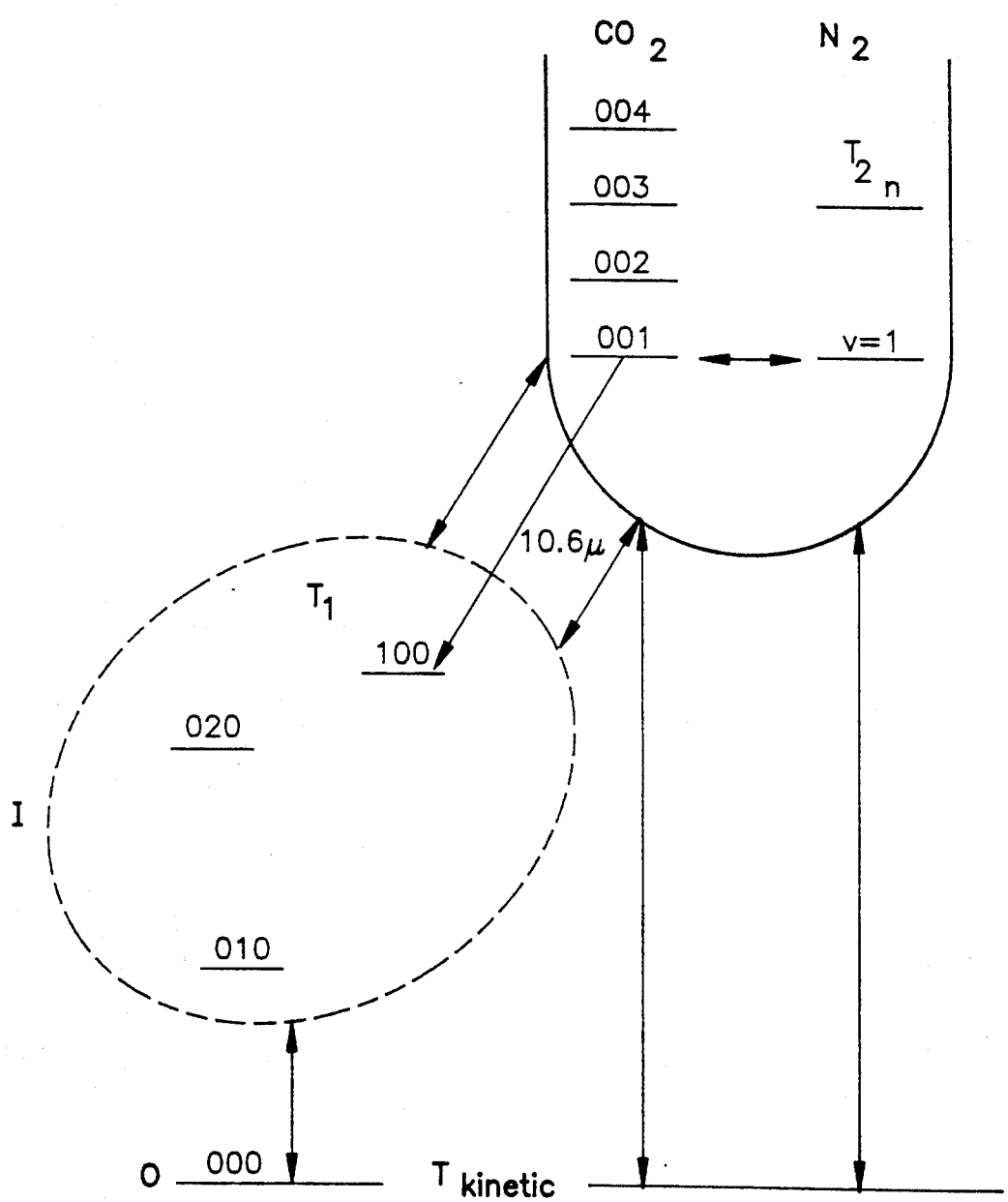
FIG. 6 illustrates relationships among $CO_2$ and $N_2$ energy levels in a $CO_2$ laser.

The kinetics of $CO_2$-$N_2$ lasers is shown in energy level format in FIG. 6. There are seven energy transfer processes that are important in describing the steady state conditions for the laser. Details of these kinetics are described in and summarized here. Each process has a forward $\uparrow$ and a reverse $\downarrow$ direction and we follow the standard nomenclature where $\uparrow$ corresponds to the process increasing the vibrational energy. Numerals in the Figure refer to the following processes:

1. electronic excitation of $CO_2$ asymmetric stretch mode;
2. vibrational energy exchange between $N_2$ and $CO_2$ asymmetric stretch mode;
3. vibrational energy exchange between asymmetric stretch and bending modes of $CO_2$;
4. electronic excitation of $N_2$;
5. depopulation of bending modes of $CO_2$;
6. spontaneous emission by $CO_2$ at 4.3$\mu$ wavelength;
7. laser transition by stimulated emission.

It is convenient to group the vibrational levels into three groups denoted by the symbols II, I and O: 1) II, the upper laser level consisting of the asymmetric stretch modes of $CO_2$ (001 and up to 00n wherein for most lasers n=5) and the vibrational levels of $N_2$ (1 to n). The grouping is convenient because of the rapid cascade repopulation of the 001 upper level from high $CO_2$ vibrational levels and also the close coupling of vibrationally excited $N_2$ and $CO_2$; 2) I, the lower laser level 100 and the other closely coupled bending modes of $CO_2$ and; 3) O, the ground state of $CO_2$ and $N_2$. The important rates for the pulsing application are the lifetime of the upper laser level, $\tau_{II\downarrow}$; the pump rate of the upper laser manifold $R_2$; the pump rate of the upper laser level by $N_2$; and the deactivation of the lower level $\tau_{I\downarrow}$. Typical mixtures of the convective laser described above are 50 Torr He, 46 torr $N_2$ and 4 torr of $CO_2$. This mixture has been found to be optimum for efficiently pumping the laser and producing an efficient reliable discharge without arcing. The high helium concentration is effective in diffusing the discharge and depopulating the lower laser level. For helium ($k_1 = 3.2 \times 10^3$ torr$^{-1}$ sec$^{-1}$) p$\tau$=0.4 $\mu$sec atm and for the 50 torr posted pressure $\tau_{I\downarrow}$ 6 $\mu$sec. The lifetime of the upper level is roughly an order of magnitude larger and is collisionally deactivated through the 100, 020 manifold. For 4 torr $CO_2$ ($k_2 = 350$ torr$^{-1}$ sec$^{-1}$), $\tau_{II\downarrow} = 0.6$ milliseconds. The volumetric pump rate of $N_2$ by electronic impact is calculated from measured values of gain and cross-sections for stimulated emission. From these we find that the volumetric pump rate of $N_2$ and therefore $CO_2$ is $R_2 = 1.9 \times 10^{21}$ cm$^{-3}$sec.

For convective controlled lasers, it is necessary to include the impact of convection on the population inversion of the $CO_2$ laser. The convection not only can replace the population inversion but it also has the important function of cooling the kinetic temperature of the gas. This latter process not only reduces the loss of inversion due to kinetics but also makes the pump rates more efficient and thereby increases the laser overall efficiency. For cross flow industrial type lasers, the time for molecular diffusion of the laser level is the convection time, D/V, where D is the laser dimension in the flow direction and V is the cross flow velocity.

The governing equations for the population of the upper level and lower level are:

$$\frac{\partial N_2}{\partial t} = R_2 - \frac{N_2}{T_2} - (N_2 - N_1)\frac{\sigma I}{h\nu} - \frac{(N_2 - N_{2o})}{T_{D2}}$$

$$\frac{\partial N_1}{\partial t} = R_1 - \frac{N_1}{T_1} + (N_2 - N_1)\frac{\sigma I}{h\nu} - \frac{(N_1 - N_{1o})}{T_{D1}}$$

where $N_2$ is the upper level population, $N_{2o}$ and $N_{1o}$ are the upper and lower level populations in the absence of stimulated emission, $R_2$ is the volumetric pump rate, $T_2$ is the collisional deactivation rate, $\sigma$ is the stimulated emission cross-section, I the laser intensity, $h\nu$ the laser photon energy and $T_{D2}$ is the convective time, $D/V$. $N_1$ is the lower level population with the corresponding source and sink terms. For cw lasers at steady state the solution to the equations is given in Smith & Mcoy, *Effects of Diffusion on the Saturation Intensity of a $CO_2$ Laser.* Appl. Phys. Lett. 15, 282-284, 1969, and the gain is given by:

$$\alpha = \sigma(N_2 - N_1) = \alpha_o\left[1 + \frac{\sigma I}{h\nu}\left(\frac{T_2 T_{D2}}{T_2 + T_{D2}} + \frac{T_1 T_{D1}}{T_1 + T_{D1}}\right)\right]^{-1}$$

where the small signal gain is $$\alpha_o = \sigma(R_w T_2 - R_1 T_1)$$

For $CO_2$ lasers, $T_2$ is at least an order of magnitude longer than the lower level lifetime $T_1$ and the second term can be ignored. The laser is usually characterized by the small signal gain, $\alpha$, and the saturation intensity, $I_s$, which is defined as that intensity necessary to reduce the gain by a factor of two $$I_s = \frac{h\nu}{\sigma}\left(\frac{T_2 + T_{D2}}{T_2 T_{D2}}\right)$$

For the industrial laser, convection dominated gain would require that $T_{D2} < T_2$ and therefore, $$I_s \approx \frac{h\nu}{\sigma T_{D2}} = \frac{h\sigma}{\nu}\frac{V}{D}$$

It is interesting to note that the laser power attainable from the laser is $\frac{1}{2}\alpha_o I_s$ times the laser volume. $\alpha_o$ the small signal gain, is set by the kinetics and the saturation intensity is dominated by convective velocity. $h\nu/\sigma$ is the laser photon energy divided by the stimulated emission cross-section. We use the experimentally determined value of 2 j/cm² from TEA laser technology results at atmospheric pressure. Extrapolating to 150 torr we have $$\frac{h\nu}{\sigma} = E_{s100torr} = 0.26 \, j/cm^2$$

Figure 5A:
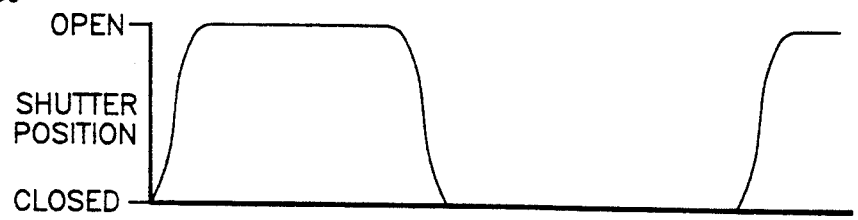
FIGS. 5(a)–(c) illustrates the time development of the laser gain in a convection-limited laser.
Figure 5B:
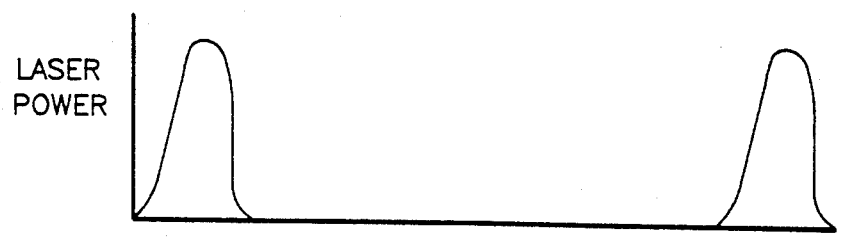

With a value of $T_{D2}$ equal to 2 msec, this gives a saturation intensity $I_s$ of 130 W/cm². The small signal gain $\alpha_o$ is about $0.005^{-1}$ and the laser volume of the laser in FIG. 3 is about 15000 cm³. Thus the calculated power attainable is $\frac{1}{2}\alpha_o I_s = 10$ KW, which is close to the 14 KW that is actually achieved. FIG. 5 is a schematic of the pulsing sequence. FIG. 5 shows the shutter sequence at the 1KHz frequency. The shutter is a mechanical chopper and has an opening rise time of 100 μsec and is open for approximately 400 μsec. The shutter off time sequence is the same, i.e., 100 μsec closing time and a shutter off time of ~400 μsec as shown in FIG. 5a. The laser power is shown in FIG. 5b. The pulse increased in intensity for ~100 μsec and turned off in the same time period producing a pulse of total duration of ~200 μsec but having a half width at half intensity of 100 μsec. Based on the average power, the energy per pulse was 11 joules, corresponding to a peak pulse power of ~100 kilowatts and an average or cw laser power of 11 kilowatts. In the absence of the adjoint beam, the laser ran cw at an average power of 11 kilowatts with identical operating parameters. This observation is extremely important in that it shows that we can obtain the same average power with the pulsing concept as with the cw beam, i.e., no loss in efficiency for pulsing. The control of the average power of 11 kilowatt laser is controlled with the modest 150 watts of average measured power in the adjoint beam.

Figure 5C:
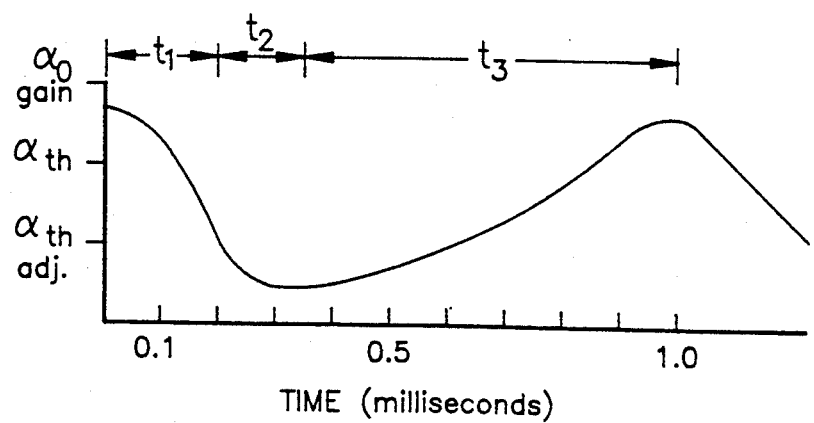

There are three important times associated with the pulsing. These three times are shown in FIG. 5c. In FIG. 5c, we represent the effective laser gain as a function of time. The maximum gain is the small signal gain in the absence of stimulated emission or lasing. When the shutter is opened, the adjoint beam increases the self feedback and the laser pulse is turned on. On this time, scale, the gas in the resonator is stationary and the laser continues to oscillate until the inversion is depleted. The time scale involved in this depletion is determined by the V—V transitions from the 002→001 $CO_2$ levels and higher as well as the vibrationally excited $N_2$ repumping of the 001 level. These times are of the order of 1 to 10 μsec. This is the shortest time possible for the pulse to extract power efficiently. In the example, the shutter is turned on in 100 μsec and this turn-on time determines the pulse duration. After the gain is depleted there is a volumetric repump that will repopulate the excited $N_2$. However, on a time scale which is on the order of $10^{-5}$ μsec, the lower level is depleted by V-T collisions. We denote that time as $t_2$ in the Figure. For every photon of energy released there is available 1.4 times that energy available to heat the gas. This gas heating further reduces the gain and also decreases the pumping efficiency. $t_3$ in FIG. 5c is the time required to repopulate the laser. This time can be either a result of $R_2$ volumetric pumping or the gas flow time for reducing the thermal temperature. The slower rate will dominate:

$$t_{3pump} = \frac{fN_2}{R_2} = 5 \times 10^{-5} \, sec$$

$$t_{3flow} = \frac{15}{10^4} = 1.5 \times 10^{-3} \, sec$$

Where f is the fraction of excited $N_2$ (or $CO_2$) molecules corresponding to $\alpha$. For our case $N_{2o}$ is $\sim 10^{17}$ cm$^{-3}$, back calculated from the small signal gain, and $R_2 = 1.9 \times 10^{21}$.

The $t_3$ pump time corresponds to the pump rate at a low kinetic gas temperature (~300° K.) and will be significantly longer at the elevated gas temperature after the laser pulses. Since the flow time is the longer, the recovery time for pulsing is of this order, i.e., the flow time determines the recovery time of the laser. This time sequence explains the observed results. Complete control of the adjoint beam, i.e., the rise time of the shutter, the open time of the shutter and the repetition rate provides control of the output.

In the present example, the laser pulse duration was controlled by the relatively slow opening time of the chopper. This opening time can be increased and therefore, increase the pulse length and is limited only by the cw power limit. If the shutter is turned on instantaneously, the laser will Q-switch producing a large leading spike followed by lasing of 1–10 $\mu$sec duration set by the depletion of the 00N CO2 levels and the vibrationally excited $N_2$. The spike can be controlled in amplitude by only partially opening a shutter (electro-optic modulator) and can be turned off to produce a 1 $\mu$sec pulse if desired. The pulse repetition rate would then be determined by the efficiency factor. In other words, if 2–3 joules are extracted in the time of 1 $\mu$sec, then the repetition rate for the present laser would have to be 5 to 4 KHz in order to efficiently extract the power from the cw electric pump. Lower energy pulses at higher repetition rates can also be obtained efficiently.

It has been discovered that a feedback aperture having an area only about 1% of the area of (or intercepting about 1% of the output power) can have a noticeable effect on the output beam, in particular, on the phase and intensity distribution. This can be viewed as a consequence of the fact that the composite resonator will have different modes than the parent resonator. If the feedback aperture 145 is made too large, serious beam quality degradation can occur compared with the beam quality associated with the parent resonator. Beam quality is calculated conventionally as a measure of the deviation of the focal spot size of the actual focused output beam from diffraction-limited. Beam quality, as well as the impact on polarization discrimination, has been calculated to be a function of the radial position of aperture 145, with a position close to the center being slightly preferred.

In addition, there is a range of feedback aperture diameters for preferred operation. If the diameter of the feedback aperture is d, the limiting diameter of the resonator (mirror or gain medium) is D, and the distance between them is L', then there will be a significant loss of feedback power when $2\lambda L'/d > D$, i.e. $d > 2\lambda L'/D$ is preferred. The beam quality perturbations discussed above set a limit on the maximum diameter that can be tolerated for aperture 145. Thus, d should be between a lower bound set by the diffraction limit and an upper bound set by the beam quality. Other parameters of the system may be varied, such as placing a smaller aperture in a more intense portion of the output radiation, so that the optimum design trade off will depend on the design of the parent resonator and the required beam quality (2x diffraction limited, 4x-, etc.). Increasing the magnification of parent resonator 100 will enhance the suppression of cw oscillation (and vice versa). Additionally, decreased magnification will produce greater intensity and so permit the use of a smaller feedback aperture.

Those skilled in the art may readily devise other embodiments of the invention. In general, the output feedback aperture and the return aperture need not be the same, though the embodiment of FIG. 1 uses a single aperture. The feedback aperture need not be placed on the output mirror. The resonator need not be a confocal standing wave resonator as illustrated. Those skilled in the art will appreciate that mechanical chopper 210 may be replaced by a solid-state modulator, either an acoustic-optic or an electro-optical modulator, any of the foregoing being referred to as beam modulation means. Also, aperture 245 in mirror 240 may be replaced by a small mirror mounted to intercept output beam 50. Likewise, the return beam could be coupled into the ring by reflection off a mirror or through an aperture. The term "feedback coupling means" will be used as a general term to denote apertures and/or mirrors.

One skilled in the art would have thought that the use of a resonator leg 40 would result in a difficult length control problem, in that the above-cited U.S. Pat. No. 4,550,410 teaches that a coupled-cavity laser is extremely sensitive to the length of the external cavity. It has been found in the high power tests that the composite resonator is very insensitive to the control leg. Successful operation was achieved with no active control and the feedback mirror resting on a surface, unprotected from vibration and other perturbation. It was found from low power tests that the parent resonator ran on the transition for which the cavity loss in the composite resonator was lowest. CO2 lasers are very well adapted to this, but any gain medium with a broad gain profile will have a correspondingly reduced sensitivity to a length change. The invention has been tested with CO2 lasers, but is not restricted to any gain medium or frequency range. Operation with YAG lasers or in the visible is also suitable. For the case of a gain medium with a narrow gain profile, active length control of the feedback means may be required. A control leg 40 that is not set in advance or actively controlled to have an optical path length equal to an integral number of half wavelengths of a particular resonator wavelength will be referred to as having "an unconstrained path length".

Figure 8:
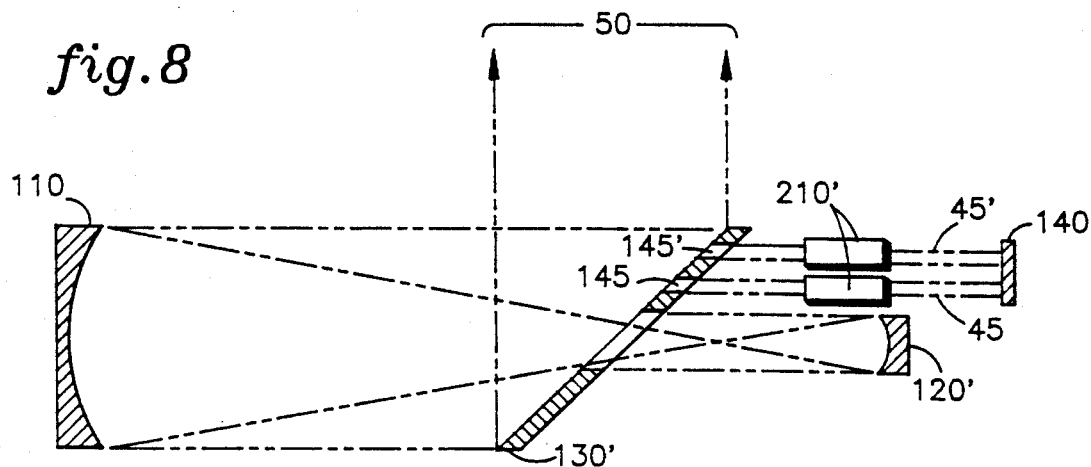
FIG. 8 illustrates an alternative embodiment of the invention for electro-optic modulation.

Systems in which the power in beam 45 is too high for a single electro-optic modulator may use the embodiment of FIG. 8, in which scraper mirror 130' has two feedback apertures 145 and 145' that are shown as having different radial locations for convenience in illustration, but may be placed anywhere convenient. Two coupling beams 45 and 45' pass through two electrooptical modulators 210' and are reflected back by a common mirror 140.

Figure 9:
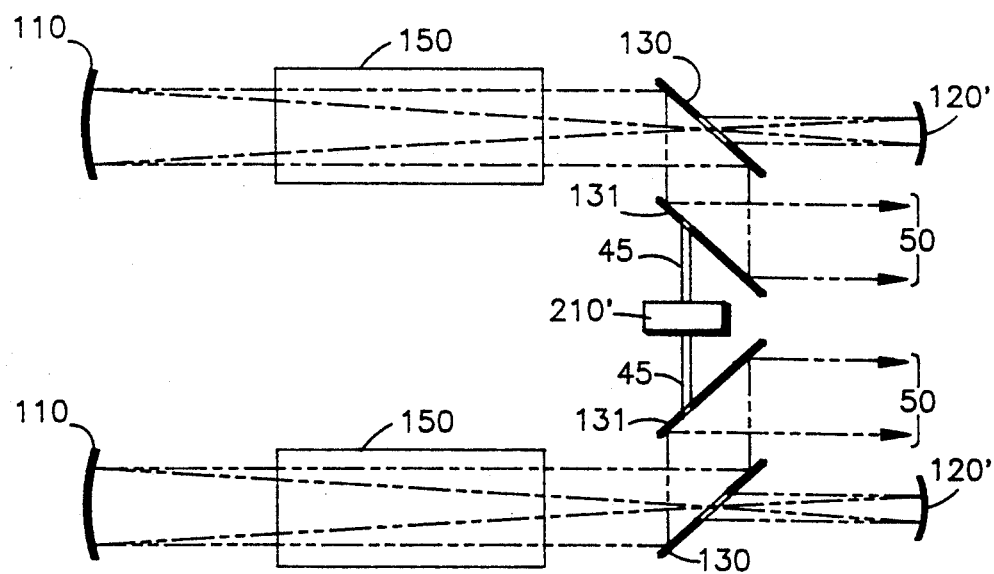
FIG. 9 illustrates an embodiment of the invention that couples and pulses two resonators.

If desired, two parent resonators may be both coupled, as shown in U.S. Pat. No. 4,682,339, and pulsed as shown in FIG. 9, in which like elements have the same reference numbers. Two coupling and feedback beams 45 serve both to couple and phase lock the two resonators and also to pulse the output. Both beams 45 are controlled by a common chopper 210'.

Other gain media could be used such as Nd:YAG oxygen-iodine, or hydrogen fluoride. Any gain medium could be used which is continuously pumped and has sufficient gain and available volume ("mode volume" is normally the term used) to justify the use of unstable resonators. Unstable resonators are normally used only where there is high gain and a large cross-sectional area (mode volume) of gain available. The range of repetition rates permissible will depend on the kinetics of the gain medium used. Other pump means are appropriate: flashlamps or diode lasers are used to pump Nd:YAG, a chemical reaction at the exit of a supersonic nozzle is used to pump oxygen-iodine and hydrogen fluoride (they are chemical lasers). Any pump means that is continuous or even pulsed, if the pulse lengths are long compared to the length of pulses desired, is permissible.

It should be understood that the invention is not limited to the particular embodiments shown and described herein, but that various changes and modifications may be made without departing from the spirit and scope of this novel concept as defined by the following claims.

What is claimed is:

1. A laser system comprising a parent standing wave unstable laser resonator having a gain medium, substantially DC pump means for producing a population inversion in said gain medium, mirror means disposed along an axis for directing optical radiation through said gain medium in a magnifying output mode and a demagnifying adjoint mode, a predetermined parent resonator gain threshold for lasing operation, a parent resonator magnification, a parent resonator feedback value, and output means for directing an output beam out of said unstable resonator, comprising;

adjoint feedback means having at least one feedback coupling means disposed to intercept radiation in said magnifying output mode, whereby a portion of said radiation in said magnifying output mode passes through said at least one feedback coupling means as an output feedback beam, and for passing through a return feedback coupling means of said at least one feedback coupling means an adjoint mode feedback beam mode matched to said demagnifying adjoint mode;

said adjoint feedback means includes adjoint feedback reflection means for receiving said output feedback beam passed through said feedback coupling means and for feeding back through said return feedback coupling means said adjoint mode feedback beam mode matched to said demagnifying adjoint mode, whereby radiation in said output mode in said parent resonator is coupled to said adjoint mode in said parent resonator through the passing of said adjoint mode feedback beam through said return feedback coupling means, and said laser system comprises a composite resonator including said parent laser resonator and a resonator control leg comprising said adjoint feedback reflection means, said composite laser resonator having a composite feedback with a total feedback value greater than said parent resonator feedback value;

feedback beam modulation means are located intercepting said output feedback beam, for alternately obstructing and passing said adjoint mode feedback beam, whereby said resonator control leg comprises said adjoint feedback reflection means and said beam modulation means;

said composite laser resonator has said total feedback value when said feedback beam modulation means passes said adjoint mode feedback beam and has said parent resonator feedback value when said beam modulation means obstructs said adjoint mode feedback beam, and said resonator control leg switches a composite feedback value of said composite laser resonator between said parent resonator value and said total feedback value;

said pump means has a predetermined capacity at least as great as a cw capacity sufficient to produce cw laser operation in said parent resonator; and said adjoint feedback means is sized and disposed to increase said composite feedback of said composite laser resonator by a predetermined modulation amount from said parent resonator feedback value such that a population inversion in said gain medium produced by said pump means when said adjoint mode feedback beam is blocked by said feedback beam modulation means is depleted by laser oscillation when said feedback beam modulation means passes said adjoint mode feedback beam, whereby lasing in said laser ring resonator is controllably switched by said beam modulation means.

2. A laser system according to claim 1, in which said at least one feedback coupling means comprises a single aperture that passes both said output feedback beam and said adjoint mode feedback beam.

3. A laser system according to claim 1, in which said modulation means further comprises control means for controlling the operation of said modulation means.

4. A laser system according to claim 3, in which said modulation means comprises a mechanical beam shutter.

5. A laser system according to claim 3, in which said modulation means comprises a solid state modulator.

6. A laser system according to claim 3, in which said modulation means further comprises control means for controlling the operation of said modulation means to couple said parent laser resonator and said control leg at a predetermined coupling rate, whereby said laser system produces an output pulse with a predetermined rise time.

7. A laser system according to claim 3, in which said modulation means further comprises control means for controlling the operation of said modulation means to couple said parent laser resonator and said control leg with at least two values of feedback power, whereby said laser system produces an output pulse with a predetermined first output power for a first of said at least two values of feedback power and a predetermined second output power for a second of said at least two values of feedback power.

8. A laser system according to either of claims 1 or 2, in which said resonator control leg has an unconstrained path length.

9. A laser system comprising a parent standing wave unstable laser resonator having a gain medium, substantially DC pump means for producing a population inversion in said gain medium, mirror means disposed along an axis for directing optical radiation through said gain medium in a magnifying output mode and a demagnifying adjoint mode, a predetermined parent resonator gain threshold for lasing operation, a parent resonator magnification, a parent resonator feedback value, and output means for directing an output beam out of said unstable resonator, comprising;

adjoint feedback means having at least one feedback coupling means disposed to intercept radiation in said magnifying output mode, whereby a portion of said radiation in said magnifying output mode passes through said at least one feedback coupling means as an output feedback beam, and for passing through a return feedback coupling means of said at least one feedback coupling means an adjoint mode feedback beam mode matched to said demagnifying adjoint mode;

said adjoint feedback means includes adjoint feedback reflection means for receiving said output feedback beam passed through said feedback coupling means and for feeding back through said return feedback coupling means said adjoint mode feedback beam mode matched to said demagnifying adjoint mode, whereby radiation in said output mode in said parent resonator is coupled to said adjoint mode in said parent resonator through the passing of said adjoint mode feedback beam through said return feedback coupling means, and said laser system comprises a composite resonator including said parent laser resonator and a resonator control leg comprising said adjoint feedback reflection means, said composite laser resonator having a composite feedback with a total feedback value greater than said parent resonator feedback value;

feedback beam modulation means are located intercepting said output feedback beam, for alternately obstructing and passing said adjoint mode feedback beam, whereby said resonator control leg comprises said adjoint feedback reflection means and said beam modulation means;

said composite laser resonator has said total feedback value when said feedback beam modulation means passes said adjoint mode feedback beam and has said parent resonator feedback value when said beam modulation means obstructs said adjoint mode feedback beam, and said resonator control leg switches a composite feedback value of said composite laser resonator between said parent resonator value and said total feedback value;

said pump means has a predetermined capacity less than a cw capacity sufficient to produce cw laser operation in said parent resonator; and said feedback coupling means is sized and disposed to feed back into said parent resonator a predetermined amount of power in said adjoint mode feedback beam and to establish a composite resonator feedback value greater than said parent resonator feedback value and sufficient to cause a composite laser resonator gain characteristic of said composite resonator to be above a composite threshold value by a predetermined amount, whereby lasing in said laser resonator is controllably switched by said beam modulation means.

10. A laser system according to claim 9, in which said at least one feedback coupling means comprises a single aperture that passes both said output feedback beam and said adjoint mode feedback beam.

11. A laser system according to claim 9, in which said modulation means further comprises control means for controlling the operation of said modulation means.

12. A laser system according to claim 11, in which said modulation means comprises a mechanical beam shutter.

13. A laser system according to claim 11, in which said modulation means comprises a solid state modulator.

14. A laser system according to claim 11, in which said modulation means further comprises control means for controlling the operation of said modulation means to couple said parent laser resonator and said control leg at a predetermined coupling rate, whereby said laser system produces an output pulse with a predetermined rise time.

15. A laser system according to claim 11, in which said modulation means further comprises control means for controlling the operation of said modulation means to couple said parent laser resonator and said control leg with at least two values of feedback power, whereby said laser system produces an output pulse with a predetermined first output power for a first of said at least two values of feedback power and a predetermined second output power for a second of said at least two values of feedback power.

16. A laser system according to either of claims 9 or 10, in which said resonator control leg has an unconstrained path length.

* * * * *